United States Patent
Zhao et al.

(10) Patent No.: US 10,405,502 B2
(45) Date of Patent: Sep. 10, 2019

(54) WATER AND SOIL CONSERVATION AND ECOLOGICAL RESTORATION METHOD OF HIGH AND STEEP, ABANDONED SLAG PILES AT HIGH ELEVATION WITH LARGE TEMPERATURE DIFFERENCE IN DRY, HOT VALLEY

(71) Applicants: Xinyu Zhao; Wenfeng Luo; CHENGDU ZHAORI ENVIRONMENTAL PROTECTION TECHNOLOGY CO., LTD., Chengdu, Sichuan (CN)

(72) Inventors: Xinyu Zhao, Chengdu (CN); Wenfeng Luo, Chengdu (CN)

(73) Assignee: Chengdu Zhaori Environmtl. Protect'n Tech. Co., Ltd., Chengdu (CN)

(*) Notice: Subject to any disclaimer, the term of this patent is extended or adjusted under 35 U.S.C. 154(b) by 501 days.

(21) Appl. No.: 15/104,930

(22) PCT Filed: Dec. 30, 2014

(86) PCT No.: PCT/CN2014/095659
§ 371 (c)(1),
(2) Date: Jun. 15, 2016

(87) PCT Pub. No.: WO2015/101295
PCT Pub. Date: Jul. 9, 2015

(65) Prior Publication Data
US 2016/0309658 A1    Oct. 27, 2016

(30) Foreign Application Priority Data
Dec. 30, 2013   (CN) .......................... 2013 1 0746146

(51) Int. Cl.
*A01G 13/02*    (2006.01)
*B09C 1/08*    (2006.01)
(Continued)

(52) U.S. Cl.
CPC ......... *A01G 13/0262* (2013.01); *A01G 22/00* (2018.02); *B09B 1/004* (2013.01);
(Continued)

(58) Field of Classification Search
CPC ........ C09K 8/607; C09K 17/10; C09K 17/40; C09K 17/44; C09K 17/52; A01G 1/001;
(Continued)

(56) References Cited

U.S. PATENT DOCUMENTS

| 1,428,808 | A | * | 9/1922 | Schiefele | ............... E02B 3/04 405/15 |
| 1,923,677 | A | * | 8/1933 | Lovett, Jr. | ............... A01G 23/04 47/74 |

(Continued)

FOREIGN PATENT DOCUMENTS

| CN | 101519966 A | 9/2009 |
| CN | 102021897 A | 4/2011 |
| CN | 103636404 A | 3/2014 |

OTHER PUBLICATIONS

Chen Kaining et al.; "Construction Method of Ecological Revetment"; Bibliographic data of CN102021897 (A); Apr. 20, 2011; http://worldwide.espacenet.com.
(Continued)

*Primary Examiner* — Joshua D Huson
*Assistant Examiner* — Christopher D Hutchens
(74) *Attorney, Agent, or Firm* — Andrew D. Fortney; Central California IP Group, P.C.

(57) ABSTRACT

A water and soil conservation and ecological restoration method of high and steep, abandoned slag piles at high
(Continued)

elevation with large temperature differential in xerothermic drought valleys, comprises: preparing a mixed material; collecting and cutting a plant to obtain a plant ingredient; preparing a treated material; digging tree holes; planting; spreading the treated material, and watering. The water and soil conservation method adds gelling material for cover soil, and stirs to allow fine particles in the cover soil to be uniformly coated on the coarse particles to realize coherence, thus effectively avoiding water erosion and wind erosion on the loose cover soil on a slope and slag pile, reducing the cover soil falling into gaps of large slag pieces on the slope surface, thus controlling the water and cover soil conservation of a slag pile, and the scale of fill earth, and ensuring the survival rate and preservation rate of planted trees.

6 Claims, 1 Drawing Sheet

(51) Int. Cl.
    *C09K 17/52*     (2006.01)
    *E02D 3/00*     (2006.01)
    *B09B 1/00*     (2006.01)
    *A01G 22/00*     (2018.01)

(52) U.S. Cl.
    CPC ............... *B09C 1/08* (2013.01); *C09K 17/52* (2013.01); *E02D 3/005* (2013.01); *B09C 2101/00* (2013.01); *Y02W 30/32* (2015.05)

(58) Field of Classification Search
    CPC .. A01G 9/102; A01G 9/0291; A01G 13/0237; A01G 13/0262; A01G 23/046; A01G 27/02; B09C 2101/00; E02D 17/20
    USPC ........ 47/58.1 SC, 1.01 T, 1.01 F; 405/16, 17
    See application file for complete search history.

(56) References Cited

U.S. PATENT DOCUMENTS

| | | | | | |
|---|---|---|---|---|---|
| 2,802,303 | A | * | 8/1957 | Weeks | C09K 17/32 106/162.5 |
| 3,938,279 | A | * | 2/1976 | Fonne | C09K 17/52 47/9 |
| 4,106,296 | A | * | 8/1978 | Leonard, Jr. | C09K 17/18 404/75 |
| 4,304,069 | A | * | 12/1981 | Kobayashi | A01C 21/00 47/58.1 R |
| 5,141,366 | A | * | 8/1992 | Ishida | A01G 25/00 405/263 |
| 5,670,567 | A | * | 9/1997 | Lahalih | C09K 17/28 524/404 |
| 5,711,997 | A | * | 1/1998 | Perani | C09K 17/40 106/719 |
| 5,829,191 | A | * | 11/1998 | Gatliff | A01G 23/046 47/58.1 R |
| 6,360,480 | B1 | * | 3/2002 | Christensen | A01G 29/00 47/48.5 |
| 7,788,846 | B2 | | 9/2010 | Kim | |
| 8,387,307 | B2 | * | 3/2013 | Kim | A01C 1/044 111/200 |
| 9,089,097 | B2 | * | 7/2015 | Ma | A01G 7/06 |
| 2006/0169178 | A1 | * | 8/2006 | Hosooka | C09K 17/10 106/656 |
| 2007/0000171 | A1 | * | 1/2007 | Stearns | A01G 24/60 47/73 |
| 2008/0005961 | A1 | * | 1/2008 | Anderson | A01G 9/00 47/74 |
| 2010/0281774 | A1 | | 11/2010 | Kim | |
| 2012/0291348 | A1 | * | 11/2012 | Hood | A01G 24/00 47/58.1 SC |
| 2014/0208645 | A1 | * | 7/2014 | Guggenheim | A01G 1/001 47/65.7 |
| 2015/0135587 | A1 | * | 5/2015 | Lister | B01J 20/3231 47/58.1 SC |

OTHER PUBLICATIONS

Ping Zhao et al.; "Method for Comprehensively Treating Ecological Environment of Coal Gangue Hill"; Bibliographic data of CN101519966 (A); Sep. 2, 2009; 2 pages; http://worldwide.espacenet.com.
Wenlong Ma et al; "Study on Ecological Rehabilitation of Soil and Water Conservation of Hydropower Project Construction in Hot-dry Valley"; Sichuan Water Power, No. 2, vol. 32; Apr. 30, 2013; 7 pages.
Zhao Xinyu; "Method for Conversing Water and Earth of High-Altitude Large-Temperature Difference Drought and Dry-Hot Valley High-Abrupt Slope Waste Slag Body"; Bibliographic Data of CN103636404(A); Mar. 19, 2014; http://worldwide.espacenet.com.
Zhao Ping et al.; "Method for Comprehensively Treating Ecological Environment of Coal Gangue Hill"; Bibliographic Data of CN101519966(A); Sep. 2, 2009; http://worldwide.espacenet.com.
International Search Report dated Feb. 17, 2015; International Application No. PCT/CR2014/095659; 2 pages; State Intellectual Property Office of the P.R. China.

* cited by examiner

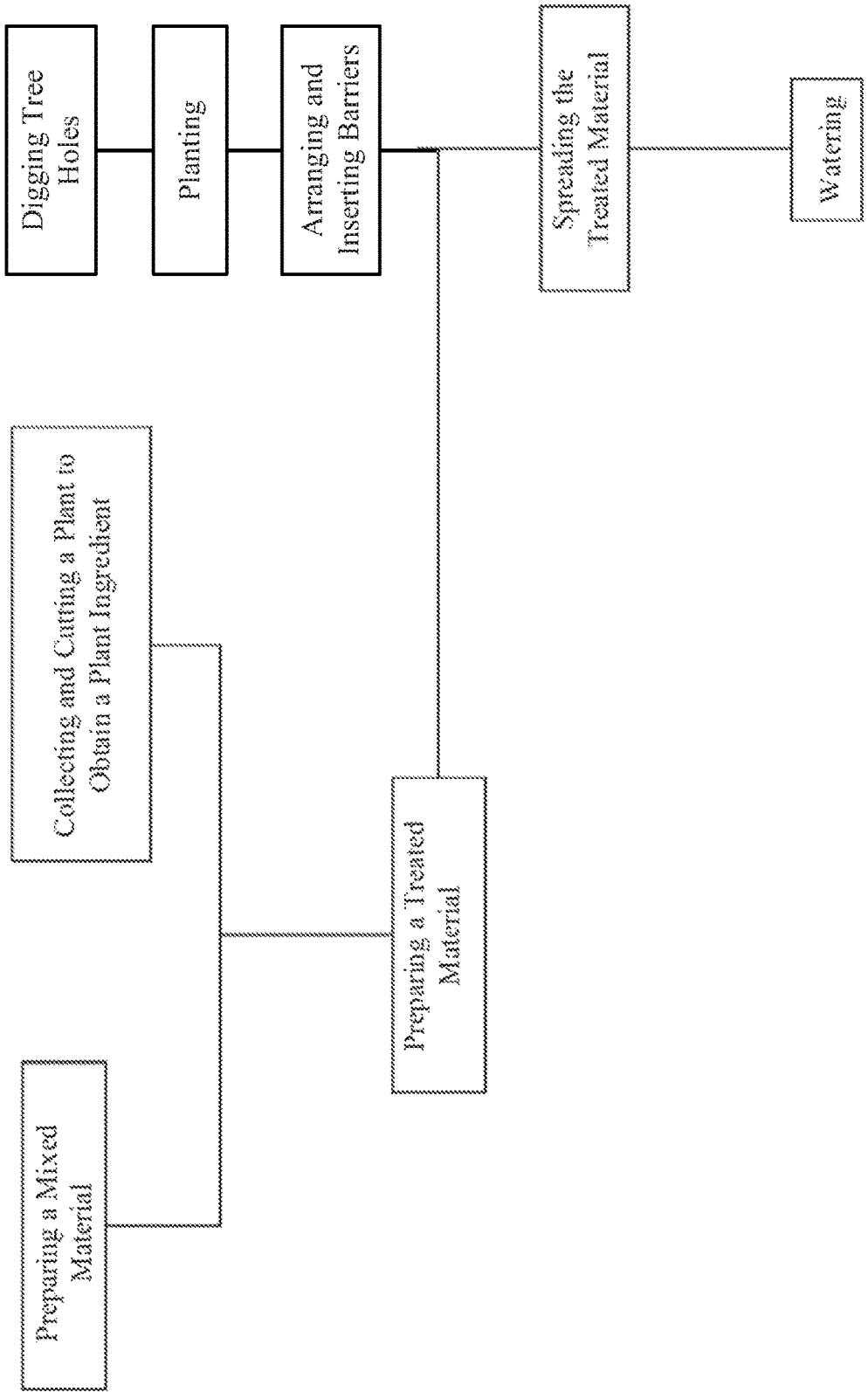

WATER AND SOIL CONSERVATION AND ECOLOGICAL RESTORATION METHOD OF HIGH AND STEEP, ABANDONED SLAG PILES AT HIGH ELEVATION WITH LARGE TEMPERATURE DIFFERENCE IN DRY, HOT VALLEY

FIELD OF THE INVENTION

The invention relates to a water and soil conservation method and specifically relates to a water and soil conservation and ecological restoration method of high and steep, abandoned slag piles at high elevation with large temperature difference in xerothermic drought valley.

BACKGROUND OF THE INVENTION

In recent years, unprecedented huge changes in natural ecology in China are brought by woodland damage, river pollution, atmospheric pollution, etc., and the sharply reducing of lake wetland and the frequent climatic disasters, seismological and geological disasters prevent the people from doing nothing for ecological deterioration and slow nonfeasance. It is urgent to gradually reduce the damage to nature caused by people till the damage is stopped, and meanwhile, to restore the ecological environment.

Soil erosion indicates the damage to the covering of soil and the water washout to the bare soil which are caused by the soil utilization of human, especially, unreasonable development and management for soil and water resources, wherein the loss amount is more than the amount of the soil developed from parent material; the soil loss is formed by parent material loss resulted from surface soil loss and subsoil loss, and finally exposes the rock. Soil erosion is divided into three types: water erosion, gravitational erosion and wind erosion. Soil erosion is quite harmful, mainly at the following aspects: 1: causing productivity of land to decrease and even lose; 2: silting rivers, lakes and reservoirs; 3: polluting water quality and influencing ecological balance; 4: forming disasters, such as, debris flow, and the like, and seriously threatening the life safety of people.

According to the statistics of the Ministry of Water Resources in recent years, the soil erosion area of land in China reaches 3,570,000 $km^2$, the total lost soil amount per year is about 5 billion tons, the lost cultivated land is about 666.6666667 $km^2$, and the economic loss caused by soil erosion per year in China is about 2.6% of GDP. Therefore, if no forceful effective measure is taken by China for containing the soil erosion, the desertification and stony desertification of the mountainous area which is 70% of the national territorial area will be aggravated, and not only the sustainable development of economic society is restricted but also the ecological safety, food safety, flood control safety and even the national security of China will be seriously threatened.

Thus, how to effectively treat the soil erosion in the restoration for the ecological environment becomes the problem in sore need of solution in China at present. The ecological management for the soil erosion mainly adopts the method of planting vegetation on the surface of the bare rock-soil, so that the root system of the plants is utilized to fix the rock-soil, prevent rain wash and strong breeze from taking a large amount of soil and maintain the soil moisture.

When the vegetation is planted on the bare rock-soil and block slag piles during the process of treating the soil erosion, a large amount of gaps exist between the rock-soil and slag piles on the slope, so that humus soil which is at least 50 cm thick is firstly covered on the bare rock-soil as cover soil, and then the plants are planted on the cover soil, and the watering at regular intervals performed so as to ensure the survival rate of the plants; after the plants survive, the rock-soil will be fixed by the root system of the plants, so that the purpose of preventing the soil erosion is further achieved.

But, resulted from the restrictions of geographical factors, climatic factors, and the like, the traditional method for treating soil erosion is not applicable to the high and steep, abandoned slag piles at high elevation with large temperature difference in xerothermic drought valley, because the gradient of the slopes in these areas is large, the natural environment is poor, the areas are located remote and a large amount of humus soil is difficult to obtain from the surrounding of the treated slope as the cover soil source. If the soil which is originally barren and covered with vegetation on the surrounding of the slope is selected as the cover soil, new soil erosion will be resulted from excavating the massif in large scale for acquiring a large amount of cover soil, and the consequence of treating the present soil erosion by destroying the soil and water ecology in the other places is getting more kicks than halfpence.

On the other hand, the gradient of the slope is large (e.g. 25-60 degrees), so that even sufficient cover soil is found, the cover soil in at least 50 cm covering thickness is still difficult to attach to the slope under gravity action, and besides, the surface of the cover soil is loosening, major dry wind appears throughout the year and the rainfall is rare at high elevation with large temperature in xerothermic drought valley, so that the cover soil is easily peeled off and blown away before the vegetation is formed, thus, the conventional conservation of water and soil is not applicable to the high and steep, abandoned slag piles at high elevation with large temperature difference in xerothermic drought valley.

Besides, at the end of the 20th century, the development of the developed economies in the world is slowed down and the economy continues to worsen, so that our country, China, which relies heavily on export, investment and consumption, had to increase the investment portion and stimulate consumption so as to promote the economy. The investment contribution of the foundation engineering constructions, such as, hydropower construction, expressway, railway, under the condition of develop-the-west strategy is maximal. Moreover, for the expressway and high speed railway at tens of thousands of kilometers and thousands of large and medium hydropower station construction and large-scale excavation works, it is difficult to find enough site and ideal position for stacking the abandoned slag piles. Thus, stacking along the river and the slope becomes the helpless choice. Large-scale stacking for the abandoned slag piles firstly destroys the vegetation in these areas once again and further deteriorates the local ecological environment, and moreover, on the surface of the abandoned slag piles, the soil texture of the abandoned slag piles is loosening and the rock-soil in the abandoned slag piles is easy to run off under the effect of rain washing, so that the soil erosion and the ecological deterioration are further intensified.

These abandoned slag piles slopes are at high gradient and mostly locate in xerothermic drought western mountainous areas at high elevation with large temperature difference, therefore, the conventional water and soil conservation method is not applicable to treating the soil erosion of these abandoned slag piles.

Thus, a water and soil conservation method adapting to the high and steep, abandoned slag piles at high elevation with large temperature difference in xerothermic drought valley is desiderated at present.

SUMMARY OF THE INVENTION

The invention aims at: providing a water and soil conservation method adapting to the high and steep, abandoned slag piles at high elevation with large temperature difference in xerothermic drought valley, in order to overcome the defect that the present water and soil conservation method is difficult to adapt to the conservation of water and soil for the high and steep, abandoned slag piles at high elevation with large temperature difference in xerothermic drought valley.

In order to achieve the said purpose, the following technical scheme is adopted by the invention:

The water and soil conservation and ecological restoration method of high and steep, abandoned slag piles at high elevation with large temperature difference in xerothermic drought valley comprises the following steps:

A: preparing a mixed material: taking a soil on a construction site as a cover soil and mixing a gelling material with the cover soil, thereby acquiring the mixed material which is uniformly mixed;

B: collecting and cutting a plant to obtain a plant ingredient: collecting a fresh and non-dry plant, and then cutting the plant into sections in length of 5-10 cm, thereby acquiring the plant ingredient;

C: preparing a treated material: mixing the plant ingredient acquired from step B, the mixed material acquired from step A and a grass seed, and uniformly stirring, thereby acquiring the treated material;

D: digging tree holes: digging a number of vertical deep holes as the tree holes at equal intervals on a slope, wherein the diameters of the tree holes are 60 cm-80 cm and the depth is 60 cm; covering a cement mortar layer at the bottom of the tree holes, wherein the cement mortar layer is in a thickness of 4-6 mm and at a mixture ratio of 1:0.7; and lastly covering a clay mud layer on a side wall of each tree hole, wherein the clay mud layer is in a thickness of 3-5 mm and at a mixture ratio of 1:0.5 and a slot is arranged on a place where the clay mud layer is at ⅓ altitude away from the bottom of each tree hole;

E: planting: planting trees in the tree holes acquired from the step D and then backfilling soil;

F: spreading the treated material: uniformly spreading the treated material acquired from the step C in a thickness of 8 cm-15 cm on the slope on which the trees are planted according to step E, and then manually flattening;

G: watering: watering the slope covered with the treated material.

In step A, the mixed material are acquired by adding the gelling material into the cover soil and then stirring, so that the fine particle components and content in the cover soil are increased; the fine particle components in the cover soil are uniformly covered on coarse particles in the manner of stirring and have a condensation function, so that the purpose of fixing soil and the problems of loosening particles and poor structural property of the cover soil are solved; when the treated material is covered on the slope, a treated material shell which is wholly in shell shape is formed and covered on the slope, so that the treated material is prevented from falling into the slope gaps and the fine particles are prevented from being blown away by strong wind, and meanwhile, the requirement of the thickness of the cover soil is also reduced, the requirement for planting the plants can be met by only spreading the treated material in a thickness of 8 cm-15 cm in step F, the quantity of the required cover soil is greatly reduced, the scale of taking the local cover soil is reduced, and the degree of damage to the local original ecological environment caused by taking the local cover soil is reduced.

In step B and step C, the 5-10 cm long plant ingredients are added into the treated material; on the one hand, the plant ingredients in the treated material have the functions of connecting ribs and reinforcing ribs, and when the treated material is spread on the slope surface of the slope, the strength of the treated material shell which is formed by the treated material is increased and the soil fixing effect of the treated material is enhanced; on the other hand, the fresh and non-dry plant ingredients are rich in water, so that the moisture of the treated material can be kept within a period of time after the treated material is covered on the slope surface, and the effect of keeping the treated material wet of the plant ingredients will gradually disappear with time, but the grass seeds have pass through the sprouting and rooting stage within this period of time, thereby increasing the survival rate of the grass seeds in the treated material, and the blended plant ingredients are gradually rotten and formed into organic humus while the growing of the grass seeds, thereby supplying the nutrients required by the growth to the grass seeds.

In step D and step E, the trees are planted on the slope; the slope is high in gradient, so that the trees are directly taken as the skeletons of the treated material covered on the slope after the trees are planted at 3 m*3 m intervals on the slope, thereby preventing the treated material from downward sliding after the treated material is covered on the slope due to the ultrahigh gradient; furthermore, after the trees survive, the trees have excellent water and soil conserving effects due to the developed root system thereof.

Under the environment of high and steep, abandoned slag piles at high elevation with large temperature difference in xerothermic drought valley, the soil texture is loosening, the rainfall is rare and the rain leakage is quick, but enough water is required in the initial stage of tree planting, so that a layer of cement mortar which is in a thickness of 4-6 mm and at a mixture ratio of 1:0.7 is covered at the bottom of the tree holes and a layer of clay mud which is in a thickness of 3-5 mm and at a mixture ratio of 1:0.5 is covered on a side wall of each tree hole in the step D; the rainwater will never flow away after leaking into the tree holes, so that the required water is supplied for the growth of the trees, thereby ensuring the survival rate of the planted trees; however, the tree roots are soaked in water when the water in the tree holes is excessive, the tree roots will rot and the growth of the trees will be influenced, so that a gap is arranged on a place where the clay mud layer is at ⅓ altitude away from the bottom of each tree hole; when the water in the tree holes is excessive, the rainwater will flow out through the gap, so that the happening of excessive rainwater in the tree holes is avoided;

After the trees survive, the trees can absorb enough water through the root systems thereof due to the growth of the root systems of the trees, but, at this moment, the root systems of the trees will be restricted by the cement mortar layer and the clay mud layer, thereby arranging the cement mortar layer in a thickness of 4-6 mm and at a mixture ratio of 1:0.7 and the clay mud layer in a thickness of 3-5 mm and at a mixture ratio of 1:0.5; after the trees survive, the root systems of the trees can easily break through the cement mortar layer and the clay mud layer, so that the cement mortar layer and the clay mud layer in the tree holes are served as temporary water containers which retain rainwater for supporting the growth of the trees at the initial production stage of the trees and do not hinder the growth of the root systems of the trees after the trees survive.

In step F, the treated material in a thickness of 8-15 cm is covered on the slope; the gelling material is added into the treated material, so that the treated material will never fall into the gap on the slope and not be blown away by the wind after the treated material is covered on the slope; compared with the treated material in the thickness of at least 50 cm required by the traditional cover soil, the treated material in a thickness of 8-15 cm covered on the slope has the advantages that the quantity of the required cover soil is greatly saved, and the scale of taking the local cover soil is reduced, namely, the degree of damage to the local original ecological environment caused by taking the local cover soil is reduced.

In step E, after the treated material is spread on the slope, the treated material is manually flattened; the surface of the treated material is smooth, so that the wind resistance is reduced and the cover soil on the surface of the treated material is prevented from being taken away by the wind.

In step F, after the treated material is spread, water is scattered on the slope, so as to supply water in the initial production stage of grass seeds and trees.

As a preferred embodiment of the invention, the preparing mixed materials in step A specifically comprises the following steps: firstly, stirring the gelling material with water, and then adding the cover soil after the gelling material and water are uniformly stirred, continuing stirring till soil is uniformly mixed with the gelling material, thereby acquiring the uniform mixed materials. The gelling material is also in granular form, so that the gelling material is firstly uniformly stirred with water and then is mixed and stirred with the cover soil, thereby ensuring the uniformity of the mixed materials and increasing the quality of the mixed materials.

As a preferred embodiment of the invention, the preparing mixed materials in step A specifically indicates directly stirring the gelling material with the cover soil, thereby acquiring the uniform mixed materials. The treated material on the slope will be watered in step G, so that a coagulating effect between the gelling material and the cover soil also can be achieved after the watering, which makes the construction convenient and simplifies the construction procedure.

As a preferred embodiment of the invention, the plants in step B are grass clippings. The grass clippings are rich in water, so that enough water is supplied for the rooting and sprouting of the grass seeds; besides, the grass clippings are easy to rot and form into organic manures, so that the required nutrients are also supplied for the rooting and sprouting of the grass seeds.

As a preferred embodiment of the invention, the plants in step B are straws. The straws are in rod shape, so that the straws are served as fertilizer after being rotten and are formed into small cavities in the treated material; due to the existence of the small cavities, the growth of the root systems is benefited after the grass seeds are rooted; furthermore, when the rainwater falls onto the slope, the rainwater leaks into these small cavities, so that the humidity of the slope is maintained as far as possible, the growth of the plants is benefited and the survival ratio of the plants is further increased.

As a preferred embodiment of the invention, the plants include grass clippings and straws, the weight ratio of grass clippings to straws is 1:1, and the grass clippings and the straws are cut together and are uniformly mixed, thereby acquiring the plant ingredients. Compared with the rotting time of the straws, the rotting time of the grass clippings is shorter, and the mixtures of the grass clippings and the straws at the weight ratio of 1:1 are taken as the plant ingredients, so that the rotting of the plant ingredients has certain stages, namely, the straws are rotten into the fertilizer after the grass clippings are firstly rotten into the fertilizer, thus, the plant ingredients can supply the fertilizer to the plants on the slope for a longer time; besides, the small cavities are formed after the straws are rotten, and due to the existence of the small cavities, the growth of the root systems after the grass seeds are rooted is benefited, furthermore, when the rainwater falls onto the slope, the rainwater leaks into these small cavities, so that the humidity of the slope is maintained as far as possible, the growth of the plants is benefited and the survival ratio of the plants is further increased.

As a preferred embodiment of the invention, the cement is taken as the gelling material in step A, wherein said weight ratio of the cement to the cover soil is: (1:100)-(5:100); in step C, the weight ratio of the plant ingredients to the cover soil is: (2:100)-(4:100) and the weight ratio of the grass seeds to the cover soil is: (2:100)-(4:100). The cement is taken as the gelling material and the weight ratio of the cement to the cover soil is: (1:100)-(5:100), so that the cement has a gelling effect while the pH value of the local soil is not greatly changed, the pH value of the treated material is fit for the growth of the plants and the hardness of the treated material after gelling does not impede the growth of the plants; the plant ingredients added into the treated material and the weight ratio of the plant ingredients to the cover soil is: (2:100)-(4:100); the plant ingredients have the functions of reinforcing ribs and fertilizer while the surface of the treated material is prevented from being ultra-rough after the treated material is spread on the slope, the wind resistance is increased and the cover soil on the surface of the treated material is prevented from being blown away by the wind.

As a preferred embodiment of the invention, the clay is taken as the gelling material in step A, wherein said weight ratio of the clay to the cover soil is: (3:100)-(7:100), in step C, the weight ratio of the plant ingredients to the cover soil is: (2:100)-(4:100) and the said weight ratio of the grass seeds to the cover soil is: (2:100)-(4:100). The clay is composed of small particles and has a pH value approximate to neutral, so that the gelling effect is achieved while the pH value of the local soil is not greatly changed by taking the clay as the gelling material, the pH value of the treated material is fit for the growth of the plants and the weight ratio of the clay to the cover soil is: (3:100)-(7:100); the hardening of the treated material, which is harmful to the growth of the plants, caused by the excessive clay is avoided, besides, the content of the small particles in the treated material is also increased, the soil mass structure is improved and the treated material is beneficial to the growth of the plants.

As a preferred embodiment of the invention, the coal ash is taken as the gelling material in step A, wherein said weight ratio of the coal ash to the cover soil is: (1:100)-(5:100); in step C, the weight ratio of the plant ingredients to the cover soil is: (2:100)-(4:100) and the said weight ratio of the grass seeds to the cover soil is: (2:100)-(4:100). The coal ash is the fine ash collected from the exhaust gas after the coal is burned and also is the main solid waste residue expelled from a coal-fired power plant; by taking the coal ash as the gelling material, firstly, the reutilization for the waste residue is realized, and meanwhile, the content of the small particles in the treated material is also increased through the coal ash and the treated material is more beneficial to the growth of the plants.

As a preferred embodiment of the invention, the spreading the treated material in step D successively comprises the following steps:

D1: arranging a number of rows of barriers on the slope, wherein said barriers in each row comprise a number of parallel branches, the branches are inserted into the slope along the direction vertical to the slope, the length of the branches is 60-80 cm with inserting depth of 40-60 cm;

D2: spreading the treated material on the slope after the barriers are completely arranged in step D1. A number of rows of barriers are arranged on the slope at intervals; the barriers in each row are used for preventing the above falling soil, so that the soil loss at the early growth stage of the plants on the slope is prevented; when the plants on the slope come into leaf and the vegetation on the slope is recovered, the branches are rotten and formed into the organic fertilizer, so that the vegetation on the slope is supplied with nutrients.

As a preferred embodiment of the invention, in step D, degradable plastic films are arranged at the bottom in the deep holes and the outer edges of the plastic films upward extend along the sidewall of the deep holes to the ⅓ altitude at the bottom of the deep holes. The degradable plastic films are used for replacing the cement mortar layer and the clay mud layer, so that the construction becomes convenient, and meanwhile, the degradable plastic films are degradable and capable of preventing environmental pollution.

From the above, by adopting the technical scheme, the invention has the beneficial effects:

1. in the water and soil conservation of high and steep, abandoned slag piles at high elevation with large temperature difference in xerothermic drought valley, the gelling material is added into the cover soil, so that the treated material is prevented from falling into the gap of the slope, the quantity of the required cover soil is greatly reduced, the scale of taking the local cover soil is reduced, namely, the degree of damage to the local original ecological environment caused by taking the local cover soil is reduced;

2. the gelling material is added into the cover soil, so that the fine particle components and content in the cover soil are increased; the fine particle components in the cover soil are uniformly covered on coarse particles in the manner of stirring and have a condensation function, so that the purpose of fixing soil and the problems of loosening particles and poor structural property of the cover soil are solved; when the treated material is covered on the slope, a treated material shell which is wholly in shell shape is formed and covered on the slope, so that the treated material is prevented from falling into the slope gaps and the fine particles are prevented from being blown away by strong wind;

3. the 5-10 cm long plant ingredients are added into the treated material; on the one hand, the plant ingredients in the treated material have the functions of connecting ribs and reinforcing ribs, and when the treated material is spread on the slope surface, the strength of the treated material shell which is formed by the treated material is increased and the soil fixing effect of the treated material is enhanced;

4. the fresh and non-dry plant ingredients are rich in water, so that the moisture of the treated material can be kept within a period of time after the treated material is covered on the slope surface, and the effect of keeping the treated material wet of the plant ingredients will gradually disappear with time, but the grass seeds have passed through the sprouting and rooting stage within this period of time, thereby increasing the survival rate of the grass seeds in the treated material, and the blended plant ingredients are gradually rotten and formed into organic humus while the growing of the grass seeds, thereby supplying the nutrients required by the growth to the grass seeds;

5. the trees are planted on the slope; firstly, the trees are directly taken as the skeletons of the treated material covered on the slope, thereby preventing the treated material from downward sliding after the treated material is covered on the slope due to the ultrahigh gradient; furthermore, after the trees survive, the excellent water and soil conserving effects will be realized due to the developed root system thereof;

6. the cement mortar layer and the clay mud layer are arranged in the tree holes and have the functions of retaining the rainwater, supplying the required water to the growth of the trees and ensuring the survival ratio of the planted trees, and the water volume in the tree holes is controlled through the gaps on the side walls of the tree holes, so that the tree roots are prevented from being rotten under the effect of excessive water;

7. compared with the treated material in the thickness of at least 50 cm required by the traditional cover soil, the treated material in a thickness of 8-15 cm covered on the slope has the advantages that the quantity of the required cover soil is greatly saved, the scale of taking the local cover soil is reduced, namely, the degree of damage to the local original ecological environment caused by taking the local cover soil is reduced.

BRIEF DESCRIPTION OF THE DRAWINGS

FIG. 1 is the flow chart of a method provided by the invention.

DETAILED DESCRIPTION OF THE EMBODIMENTS

In order to make the purpose, technical scheme and advantages of the invention be more clear and explicit, the invention is further described in details by combining the figures with the embodiments as below. It should be understood that the described embodiments here are only used for explaining the invention but not for limiting the invention.

A slag disposal pit which is used for stacking the abandoned slag while tunneling and is located on the drought river valley on the upper reaches of the Minjiang River is taken as an experimental area, wherein this area is located in the western Sichuan highland climate area, features a monsoon climate in mountainous regions; in winter, this area is cold and dry, and features strong sunlight, sunny weather, few rainfall and large daily temperature difference; in summer, this area is hot and wet, and features obvious rainy season and has such disasters as strong wind, summer drought, and the like; the average annual rainfall for many years is respectively 507.4 mm; the average temperature for many years is at 13.5° C.; the extreme maximum temperature is at 35.6° C.; the extreme minimum temperature is at −7.4° C.; the maximum rainfall in one day is 66.7 mm; the average annual evaporation capacity for many years is about 1,600 mm. The slags in the slag disposal pit of the experimental area mainly comprise the tunneling digging rock blocks; the geological rocks mostly are sericite phyllite, sandstone, crystalline limestone, and the like; the gradient of the slag disposal pit of the experimental area is at 35-57 degrees.

Firstly, six experimental plots in same areas are divided side by side along the horizontal direction on the slope of the slag disposal pit of the experimental area, and the experimental plots are numbered one by one, wherein the horizontal length of each experimental plot is 15 m, the length along the slope is 60 m and the distance between the two adjacent experimental plots is 1 m.

Embodiment 1: Successively Executing the Following Steps in No. 1 Experimental Plot A. Uniformly mixing cement with water, adding cover soil collected from the construction site according to a weight ratio of the cement to the cover soil at 3:100, and uniformly stirring, thereby acquiring mixed material;

B. Collecting fresh and non-dry plants, and then cutting the plants into sections in length of 5-10 cm, thereby acquiring plant ingredients;

C. Mixing the plant ingredients acquired from step B, the mixed materials acquired from step A and grass seeds, and uniformly stirring, thereby acquiring treated material, wherein the weight ratio of the grass seeds to the cover soil is 3:100 and the weight ratio of the plant ingredients to the cover soil is: 4:100;

D. Digging vertical deep holes as the tree holes at 3 m*3 m intervals on the slope, wherein the diameters of the tree holes are 60 cm-80 cm and the depth is 60 cm; covering a cement mortar layer at the bottom of the tree holes, wherein the cement mortar layer is in a thickness of 4-6 mm and at a mixture ratio of 1:0.7; and lastly covering a clay mud layer on a side wall of each tree hole, wherein the clay mud layer is in a thickness of 3-5 mm and at a mixture ratio of 1:0.5; and an annular slot is arranged on a place where the clay mud layer is at ⅓ altitude away from the bottom of each tree hole;

E. Planting trees in the tree holes acquired from step D and then backfilling soil;

F. Uniformly spreading the treated material acquired from step C in a thickness of 10 cm on the slope on which the trees are planted according to step E, and then manually flattening;

G. Watering the slope covered with the treated material.

On the 30th day after step G is finished, starting to measure the moisture content of the soil at 10 cm below the soil surface of the No. 1 experimental plot for the first time, recording, and then repeating the measurement once per 30 days and recording (see Table 1 for the recorded data); in the 12th month after step G is finished, measuring the content of organic matter and nitrogen in the soil on the soil surface of the No. 1 experimental plot, recording, and then repeating the measurement once per 12 months and recording (see Table 2 for the recorded data).

Embodiment 2: Successively Executing the Following Steps in No. 2 Experimental Plot A. Uniformly mixing clay with water, adding cover soil collected from the construction site according to a weight ratio of the clay to the cover soil at 5:100, and uniformly stirring, thereby acquiring mixed material;

Executing the following steps identical to steps B, C, D, E, F and G in Embodiment 1.

On the 30th day after step G is finished, starting to measure the moisture content of the soil at 10 cm below the soil surface of No. 1 experimental plot for the first time, recording, and then repeating the measurement once per 30 days and recording (see Table 1 for the recorded data); in the 12th month after step G is finished, measuring the content of organic matter and nitrogen in the soil on the soil surface of No. 2 experimental plot, recording, and then repeating the measurement once per 12 months and recording (see Table 2 for the recorded data).

Embodiment 3: Successively Executing the Following Steps in No. 3 Experimental Plot A. Uniformly mixing coal ash with water, adding cover soil collected from the construction site according to a weight ratio of the coal ash to the cover soil at 3:100, and uniformly stirring, thereby acquiring mixed material;

Executing the following steps identical to steps B, C, D, E, F and G in Embodiment 1.

On the 30th day after step G is finished, starting to measure the moisture content of the soil at 10 cm below the soil surface of No. 3 experimental plot for the first time, recording, and then repeating the measurement once per 30 days and recording (see Table 1 for the recorded data); in the 12th month after step G is finished, measuring the content of organic matter and nitrogen in the soil on the soil surface of No. 3 experimental plot, recording, and then repeating the measurement once per 12 months and recording (see Table 2 for the recorded data).

Contrasting Embodiment 1: Successively Executing the Following Steps in No. 4 Experimental Plot A. Collecting fresh and non-dry plants, and then cutting the plants into sections in length of 5-10 cm, thereby acquiring plant ingredients;

B. Taking the soil on the construction site as cover soil, mixing the cover soil, grass seeds, the plant ingredients acquired from step A and water, and uniformly stirring, thereby acquiring treated material, wherein the weight ratio of the grass seeds to the cover soil is 3:100 and the weight ratio of the plant ingredients to the cover soil is 4:100;

C. Spreading the treated material on the slope and manually flattening, wherein the thickness of the treated material is 10 cm;

D. Watering the slope covered with the treated material.

On the 30th day after step D is finished, starting to measure the moisture content of the soil at 10 cm below the soil surface of No. 4 experimental plot for the first time, recording, and then repeating the measurement once per 30 days and recording (see Table 1 for the recorded data); in the 12th month after step G is finished, measuring the content of organic matter and nitrogen in the soil on the soil surface of No. 4 experimental plot, recording, and then repeating the measurement once per 12 months and recording (see table 2 for the recorded data).

Contrasting Embodiment 2: Successively Executing the Following Steps in No. 5 Experimental Plot A. Taking the soil on the construction site as cover soil, adding grass seeds into the cover soil, adding water, and uniformly stirring, thereby acquiring treated material, wherein the weight ratio of the grass seeds to the cover soil is 3:100;

Executing the following steps identical to steps C and D in contrasting embodiment 1.

On the 30th day after step D is finished, starting to measure the moisture content of the soil at 10 cm below the soil surface of No. 5 experimental plot for the first time, recording, and then repeating the measurement once per 30 days and recording (see table 1 for the recorded data); in the 12th month after step G is finished, measuring the content of organic matter and nitrogen in the soil on the soil surface of No. 5 experimental plot, recording, and then repeating the measurement once per 12 months and recording (see table 2 for the recorded data).

The above Embodiments 1, 2 and 3, and contrasting embodiments 1 and 2 are started on the same day in April, 2010 and ended on the same day.

Contrasting Embodiment 3: Uniformly Scattering Grass Seeds as Heavy as the Grass Seeds in Embodiment 1 on the Slope Under the Natural State in No. 6 Experimental Plot And measuring the moisture content of the soil at 10 cm below the soil surface at the time of measuring the moisture content in other experimental plots and recording in Table 1; measuring the content of organic matter and nitrogen in the soil on the soil surface at the time of measuring the content in other experimental plots and recording in Table 2.

TABLE 1 the moisture content (%) of the soil at 10 cm below the soil surface of the abandoned slag slope

| Month | No. 1 | No. 2 | No. 3 | No. 4 | No. 5 | No. 6 |
|---|---|---|---|---|---|---|
| May | 10.2 | 10.8 | 10.5 | 9.9 | 9.6 | 7.8 |
| June | 10.9 | 11.7 | 11.2 | 10.6 | 10.0 | 8.3 |
| July | 12.2 | 12.9 | 11.5 | 11.9 | 11.5 | 9.7 |
| August | 11.9 | 12.6 | 12.0 | 11.6 | 11.4 | 9.4 |
| September | 11.2 | 11.8 | 11.6 | 10.8 | 10.7 | 8.9 |
| October | 10.5 | 11.1 | 10.7 | 10.3 | 10.1 | 8.0 |

After the vegetation on the slope grows up, on the slope of the same slag disposal pit, the areas, in which the vegetation grows more excellent, are higher in moisture content of soil and higher in water retaining capacity, so that the good and bad conditions of the growth of the vegetation on the slope in each experimental plot can be measured by measuring and comparing the moisture content of the soil in each experimental plot.

According to Table 1, the water contents of the surface soil in No. 1, No. 2, No. 3, No. 4 and No. 5 experimental plots are all far higher than that of the surface soil in No. 6 experimental plot, that is to say, as long as the cover soil is mixed with water, the water content of the surface soil is far higher than the water content of the original land surface soil, the cover soil after being mixed with water has excellent water retaining capacity, and the vegetation growing on the cover soil is better than that on the original and under natural state; the water contents of the surface soil in No. 1, No. 2 and No. 3 experimental plots are higher than the water contents of the surface soil in No. 4 and No. 5 experimental plots, that is to say, the vegetation growing on the cover soil added with the gelling material is better than that on the cover soil without the gelling material. The test proves that the vegetation on the cover soil added and mixed with the gelling material can grow well and the root system of the vegetation has an excellent water conservation function.

TABLE 2

Conditions of Soil Nutrients on the Soil Surface of the Abandoned Slag Slope

| No. | Measuring Year | Organic Matter | Nitrogen Percentage (%) |
|---|---|---|---|
| No. 1 | 2011 | 2.34 | 0.128 |
|  | 2012 | 2.50 | 0.135 |
|  | 2013 | 2.58 | 0.126 |
| No. 2 | 2011 | 2.36 | 0.091 |
|  | 2012 | 2.48 | 0.088 |
|  | 2013 | 2.54 | 0.082 |
| No. 3 | 2011 | 2.36 | 0.091 |
|  | 2012 | 2.48 | 0.088 |
|  | 2013 | 2.54 | 0.082 |
| No. 4 | 2011 | 2.25 | 0.081 |
|  | 2012 | 2.37 | 0.087 |
|  | 2013 | 2.51 | 0.091 |
| No. 5 | 2011 | 2.01 | 0.105 |
|  | 2012 | 2.26 | 0.088 |
|  | 2013 | 2.38 | 0.079 |
| No. 6 | 2011 | 1.57 | 0.154 |
|  | 2012 | 1.81 | 0.147 |
|  | 2013 | 1.73 | 0.165 |

After the plants grow up, the dead leaves will rot into organic matters under the presence of water, following the alternation of seasons, and meanwhile, the organic matters also can be served as nutrient for supporting the growth of the plants, so that a local ecological system is formed, and thus, the contents of the organic matters of the soil on the soil surfaces of the experimental plots can be utilized to measure whether the vegetation in the experimental plots grow well.

While growing, the plants will consume the nitrogen in soil, so that the growth condition of the plants also can be measured by detecting the change in nitrogen in soil.

Thus, on the slope of the same slag disposal pit, the area, in which the vegetation grow well, is higher in organic matter content on the soil surface and is large in change in nitrogen in the soil.

Therefore, Table 2 shows that the vegetation growing condition on the slope covered with the cover soil mixed with water and grass seeds is better than that of the vegetation which grow from the grass seeds directly scattered on the slope of the original land; furthermore, the vegetation on the treated material mixed with the gelling material are better than that growing on the treated material without the gelling material.

According to the water and soil conservation and ecological restoration method of high and steep, abandoned slag piles at high elevation with large temperature difference in xerothermic drought valley provided by the invention, the gelling material is added into the cover soil, so that the treated material is prevented from falling into the gap of the slope, the quantity of the required cover soil is greatly reduced, the scale of taking the local cover soil is reduced, and the degree of damage to the local original ecological environment caused by taking the local cover soil is reduced; furthermore, the test proves that the growth of the vegetation on the cover soil which is mixed with water and then is mixed with the grass seeds is better than that of the vegetation on the slope on which the grass seeds are directly scattered under natural state, that is to say, after the cover soil is mixed, the growth of the vegetation will be benefited, and meanwhile, the root system has a water-retaining and soil-fixing function after the vegetation grow up, thus, the soil on the slope is kept wet, and the dead leaves of the plants will be rotten under the humid environment following the increasing of the year, thereby being capable of increasing the proportion of the organic matters in the soil year by year, and besides, the organic matters can supply nutrients for the growth of the plants, thereby being capable of forming an excellent ecological cycle, causing the growth of the vegetation on the treated slope to be better and better and further achieving the purpose of keeping the water and soil on the slope.

The comparison of tests proves that the vegetation growing on the cover soil mixed with the gelling material are better than that growing on the cover soil without the gelling material, therefore adding the gelling material into the cover soil, mixing with water and then spreading the acquired treated material on the slope, and furthermore, in the preferred scheme, the soil on the slope can be effectively prevented from falling off and the growth of the vegetation on the slope can be benefited, by arranging multiple rows of barriers at intervals on the slope, thus, such a water and soil conservation method is suitable for the water and soil conservation of high and steep, abandoned slag piles at high elevation with large temperature difference in xerothermic drought valley.

The key technology of above methods is that various materials are mixed and used for solving the problems of the method and technique for conserving soil and water and restoring the vegetation on the high and steep slope and large slag surface of the construction engineering slag disposal pit. The specific method is as follows: mixing trace gelling materials (cement, coal ash, clay, and the like) with local soil (sand soil or impurity soil), grass clippings, grass seeds, and the like, in different proportions for tens of groups, and then manually spreading on the side slope and steep slope of the slag disposal pit, thereby achieving the soil-fixing, slope-stabilizing, soil-conserving and water-conserving effects. Such a "precision work" aims to reduce the thickness of the cover soil on the slope and reduce the quantity of the taken or purchased soil (the water and soil conservation and vegetation ecological environment on the digging area will be certainly damaged by the soil taking and soil purchasing in any manner). The said precision work indicates taking the cover soil as the lime and cement mortar paved for a vertical wall of a house and causing the stirred mixed soil to form "block" or "shell", thereby preventing all the cover soils from being shaken into the gaps of imbalanced block slag piles or being eroded by rainwater.

The purpose of adding the trace gelling material into the loosening sand particle soil is to increase the fine particle components or content and to cause the fine particles to be evenly wrapped on the coarse particles in the manner of stirring and have a condensation function, thereby achieving the purposes of fixing the soil and solving the soil erosion problems, such as, the soil particles are loosening, the structural property is poor, the fine dust particles are easily blown away by the strong wind, the slope cannot resist rainwater wash, and the like. The "trace mixing" indicates that the mixing proportion of the other gelling material should be controlled within the scope of 1%-5%, except for the mixing proportion of the clay as high as 10%; namely, the soil should be conserved while the soil texture and the acid-base property of the soil are not greatly changed.

Mixing the grass clippings indicates cutting the collected or purchased weeds into the 5-10 cm long grass clippings, and then manually dry mixing with a shovel or adding a defined amount of water or mixing with the gelling material, and then paving onto the slope. By mixing the grass clippings, on one hand, the grass clippings have the (connecting and soil-fixing) function of reinforcing ribs in the soil; on the other hand, when the grass seeds grow, the mixed grass clippings are rotten and formed into organic (humus) matters, and after rotting in the soil, the grass clippings are served as fertilizer and are formed into fine "cavities", thereby being beneficial to the growth of other plants. The fresh grass clippings are not the unique organic treated material, and while governing the sloping fields around the house, the local farmer can adopt organic refuses, such as, mixed peel, abandoned vegetable leaves, and the like, which have the same function as the grass clippings.

The purpose of adding water and manually mixing is to increase the coagulation of the loosening sand particle soil, cause the soil to be more evenly paved on the slope surface of the steep slope and cause the coarse particles not to easily dissociate, fall and separate. The mixing contains the experimental sets, such as, singly mixing with water, mixing with the gelling material, mixing with the grass clippings and the gelling material, and the like, and the experimental set of mixing the grass clippings without water.

According to the above method, compared with the slope surface soil without mixing, the surface soil on the cover soil after being stirred or mixed contains more nutrients (e.g., organic matters and fertilizer). Furthermore, the proportion of the organic matters is obviously increased with time; the nitrogen fertilizer proportion is gradually reduced with time and the quantity of the mixture, but it is in little fluctuation; and the change in phosphorus containing proportion is not obvious. The change in the content and proportion of the soil fertility indicates that, in the absence of manual fertilization and fertilizing, some element nutrients contained in the soil are consumed by the plant growth. If the surface of the slag disposal pit is used for restoring cultivation, the fertilization and fertilizing applying measures should be taken for increasing the soil fertility. The conversion from ecological restoration under manual intervention to "self-adapting, self-regulating and natural growing" ecological restoration can be realized.

According to the above method, anyone who is willing to participate in ecological management can adopt the convenient, simple and economical method for positively implementing water and soil conservation and ecological restoration. All the farmers and land contract operators can adopt such a simple and practicable method for improving the slope cropland, hanger, grassland or the vegetation planting environment around the house and turning any lands and slope fields into fertile farmlands and gardens.

Any alteration, equivalent replacement and improvement without departing from the spirit and principle of the invention all should be in the protection scope of the invention.

What is claimed is:

1. A water and soil conservation and ecological restoration method, comprising:
preparing a uniformly mixed material by taking a soil on a construction site as a cover soil, uniformly mixing a cement with water, and then adding the cover soil into the cement according to a weight ratio of cement to cover soil at 3:100, and stirring, thereby acquiring the uniformly mixed material;
collecting and cutting a plant to obtain a plant ingredient by collecting a fresh, non-dry plant, and then cutting the plant into sections of 5-10 cm in length, thereby acquiring the plant ingredient;
preparing a treated material by mixing the plant ingredient, the uniformly mixed material and a grass seed, and uniformly stirring, thereby acquiring the treated material, wherein the weight ratio of the grass seed to the cover soil is 3:100 and the weight ratio of the plant ingredient to the cover soil is 4:100;

digging tree holes by digging a number of vertical deep holes as the tree holes at 3 m*3 m intervals on a slope, wherein the diameters of the tree holes are 60 cm-80 cm and the depth is 60 cm;

covering a cement mortar layer at a bottom of the tree holes, wherein the cement mortar layer has a thickness of 4-6 mm; and lastly covering a clay mud layer on a side wall of each tree hole, wherein the clay mud layer has a thickness of 3-5 mm and a slot is arranged on a place where the clay mud layer is at ⅓ altitude away from the bottom of each tree hole;

planting trees in the tree holes and then backfilling the cover soil;

uniformly spreading the treated material in a thickness of 10 cm on the slope on which the trees are planted, and then manually flattening the treated material;

and watering the slope covered with the treated material.

2. The water and soil conservation and ecological restoration method according to claim 1, wherein said plants comprise grass clippings.

3. The water and soil conservation and ecological restoration method according to claim 1, wherein said plants comprise straw.

4. The water and soil conservation and ecological restoration method according to claim 1, wherein said plants include grass clippings and straw in a weight ratio of grass clippings to straws of 1:1, and the grass clippings and the straw are cut together and are uniformly mixed.

5. The water and soil conservation and ecological restoration method according to claim 1, wherein spreading the treated material comprises:

arranging a number of rows of barriers on the slope, wherein said barriers are inserted at a depth of 40-60 cm into the slope along a direction vertical to the slope, and the barriers have a length of 60-80 cm; and spreading the treated material on the slope after the barriers are completely arranged.

6. The water and soil conservation and ecological restoration method according to claim 5, wherein each of the barriers comprises a branch, and the method further comprises allowing the branches to rot and form organic fertilizer when the trees come into leaf.

* * * * *